United States Patent [19]

Focke

[11] Patent Number: 5,070,994
[45] Date of Patent: Dec. 10, 1991

[54] PROCESS AND APPARATUS FOR TRANSFERRING ARTICLES FED ON A SINGLE TRACK ONTO SEVERAL DISCHARGE TRACKS

[75] Inventor: Heinz Focke, Verden, Fed. Rep. of Germany

[73] Assignee: Focke & Co. (GmbH & Co.), Verden, Fed. Rep. of Germany

[21] Appl. No.: 426,264

[22] Filed: Oct. 25, 1989

[30] Foreign Application Priority Data

Oct. 26, 1988 [DE] Fed. Rep. of Germany ....... 3836363

[51] Int. Cl.$^5$ .............................................. B65G 29/00
[52] U.S. Cl. ..................................... 198/441; 198/458
[58] Field of Search ............... 198/347, 370, 357, 441, 198/427, 458

[56] References Cited

U.S. PATENT DOCUMENTS

| | | | |
|---|---|---|---|
| 2,712,376 | 7/1955 | Bruestle | 198/441 X |
| 3,717,239 | 2/1973 | Carter | 198/441 X |
| 3,782,523 | 1/1974 | Giatti | 198/347 |
| 3,967,717 | 7/1976 | Bauer | 198/441 |
| 4,498,576 | 2/1985 | Anderson | 198/441 X |
| 4,523,671 | 6/1985 | Campbell | 198/441 X |

FOREIGN PATENT DOCUMENTS

| | | | |
|---|---|---|---|
| 1632238 | 12/1970 | Fed. Rep. of Germany | 198/441 |
| 1402494 | 6/1988 | U.S.S.R. | 198/441 |
| 178807 | 6/1923 | United Kingdom | 198/441 |

Primary Examiner—D. Glenn Dayoan
Assistant Examiner—Keith L. Dixon
Attorney, Agent, or Firm—Sughrue, Mion, Zinn, Macpeak & Seas

[57] ABSTRACT

Process and apparatus for transferring articles fed on a single track onto several discharge tracks. Where packaging machines are concerned, there is often the need for articles, especially (small) packs (10), preferably conveyed in close succession on a feed track (11), to be distributed to several, especially two tracks leading further (discharge tracks 12, 13). For the efficient continuous allocation of the packs (10) to two discharge tracks (12, 13), there is a distributor drum (15), on the circumference of which the continuously conveyed packs (10) are shifted sideways during conveyance and at the same time are aligned with the parallel discharge tracks (12, 13) arranged at a distance from one another. The continuously rotating distributor drum makes it possible to allocate the packs to several discharge tracks without interrupting the feed flow.

17 Claims, 11 Drawing Sheets

PROCESS AND APPARATUS FOR TRANSFERRING ARTICLES FED ON A SINGLE TRACK ONTO SEVERAL DISCHARGE TRACKS

BACKGROUND OF THE INVENTION

The invention relates to a process for transferring articles, especially (cigarette) packs, fed in a continuous series on a feed track onto several, especially two tracks leading further (discharge tracks). The invention relates, furthermore, to an apparatus for carrying out this process.

Where packaging machines are concerned, there is often the need to divide articles fed in a row into several rows leading off. For example, on packaging machines for (cigarette) packs the packs fed from the packaging machine in a continuous closely arranged row have to be allocated to two discharge tracks and are then supplied for further processing, for example to an outer-wrapping machine.

This dividing-up operation must be organised in such a way that the (continuous) feed flow of articles (packs) is not impaired.

SUMMARY OF THE INVENTION

The object of this invention is based, therefore, on organising the distribution of articles taken from a single string into several strings leading off, in such a way that the feed flow is not impaired and a high conveying capacity is achieved, a careful treatment of the articles being ensured at the same time.

To achieve this object, the process according to the invention is characterised in that, during preferably continuous transport along a distributor track, the oncoming articles are fed to the associated discharge tracks as a result of a differing shift transverse relative to the feed track. Preferably, in the region of the distributor track the oncoming articles are moved alternately to one side and the other transversely relative to the feed track and are thereby fed to the discharge tracks.

In the process according to the invention, the feeding of the articles to the several discharge tracks takes place by means of a transverse movement during further transport, preferably along a distributor track in the form of a quarter circle. An uninterrupted flow of movement of the articles in the conveying direction is thereby ensured.

The apparatus according to the invention for feeding articles to especially two parallel discharge tracks possesses, according to the invention, a distributor conveyor, in the region of which, during transport, the articles can be moved transversely relative to the feed track and aligned with the discharge tracks and fed to these.

According to the invention, the distributor conveyor is designed as a preferably continuously rotating distributor drum, on the circumference of which the articles are shiftable transversely during the rotational movement. The feed track runs up to the circumference of the horizontal distributor drum approximately in the horizontal mid-plane of the latter. The articles are then conveyed downwards over a quarter circle by the distributor drum and shifted transversely to come into alignment with the discharge tracks. These extend approximately tangentially up to the underside of the distributor drum.

The distributor drum is designed so that two articles are extracted simultaneously from a closely arranged row of these in the region of the feed track and, during the rotation of the distributor drum, are shifted in an axis-parallel manner in opposite directions. For this purpose, the distributor drum is equipped with slide members movable to and from in an axis-parallel manner and each intended for an article. The two articles conveyed simultaneously by the distributor drum rest on sliding planes offset in the radial direction.

With the apparatus according to the invention, cuboid articles, while they are being allocated to the discharge tracks, are at the same time rotated through 90°, for example from a vertical position in the region of the feed track into a horizontal position in the region of the discharge tracks.

Further features of the invention relate to the design of the distributor drum and conveying members assigned to this.

Exemplary embodiments of the invention are described in detail below by means of the drawings. In these.

BRIEF DESCRIPTION OF THE DRAWINGS

DETAILED DESCRIPTION OF PREFERRED EMBODIMENTS

Figure 1:
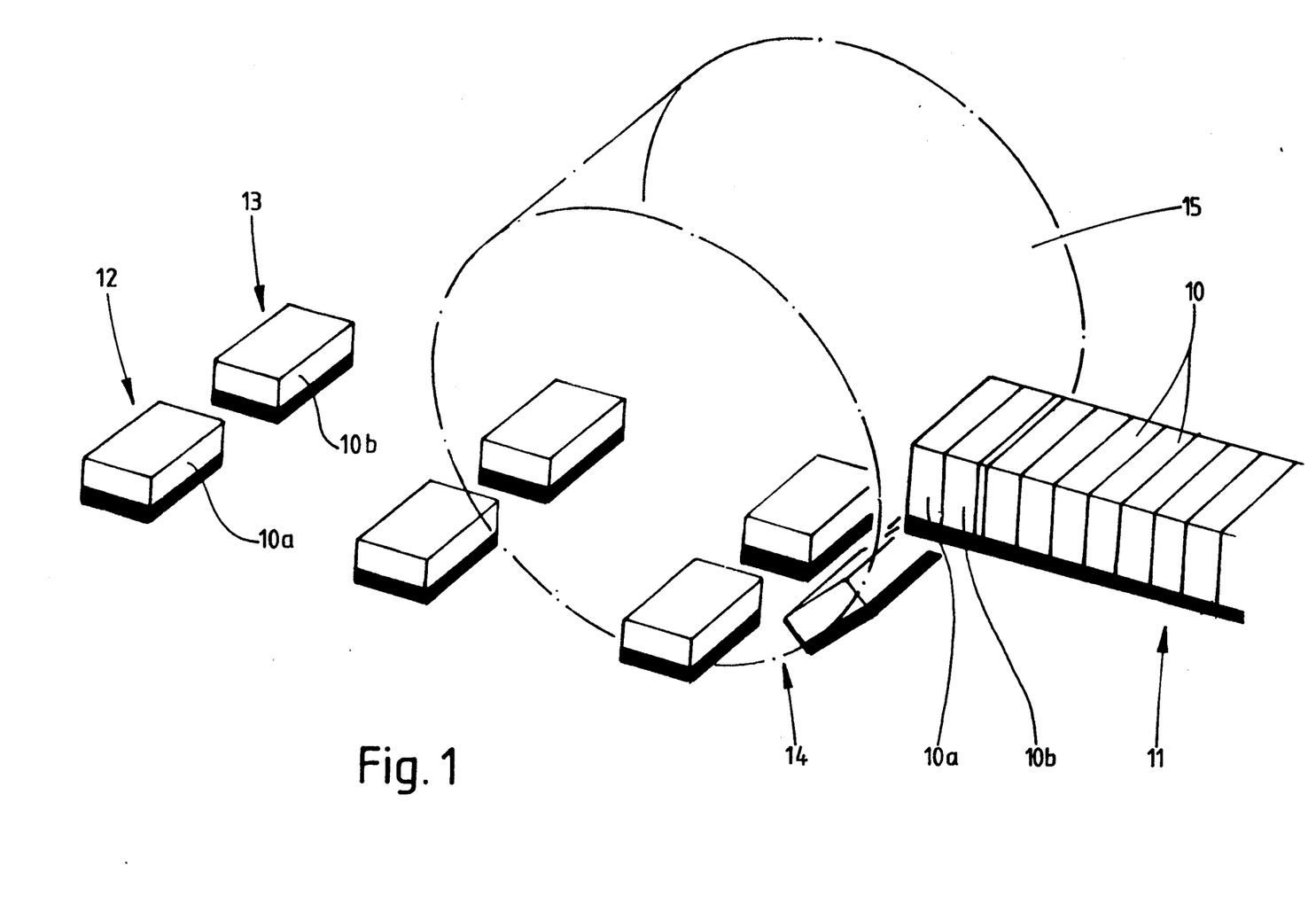
FIG. 1 shows a simplified perspective representation of the conveying tracks of a first embodiment of the invention.
Figure 2:
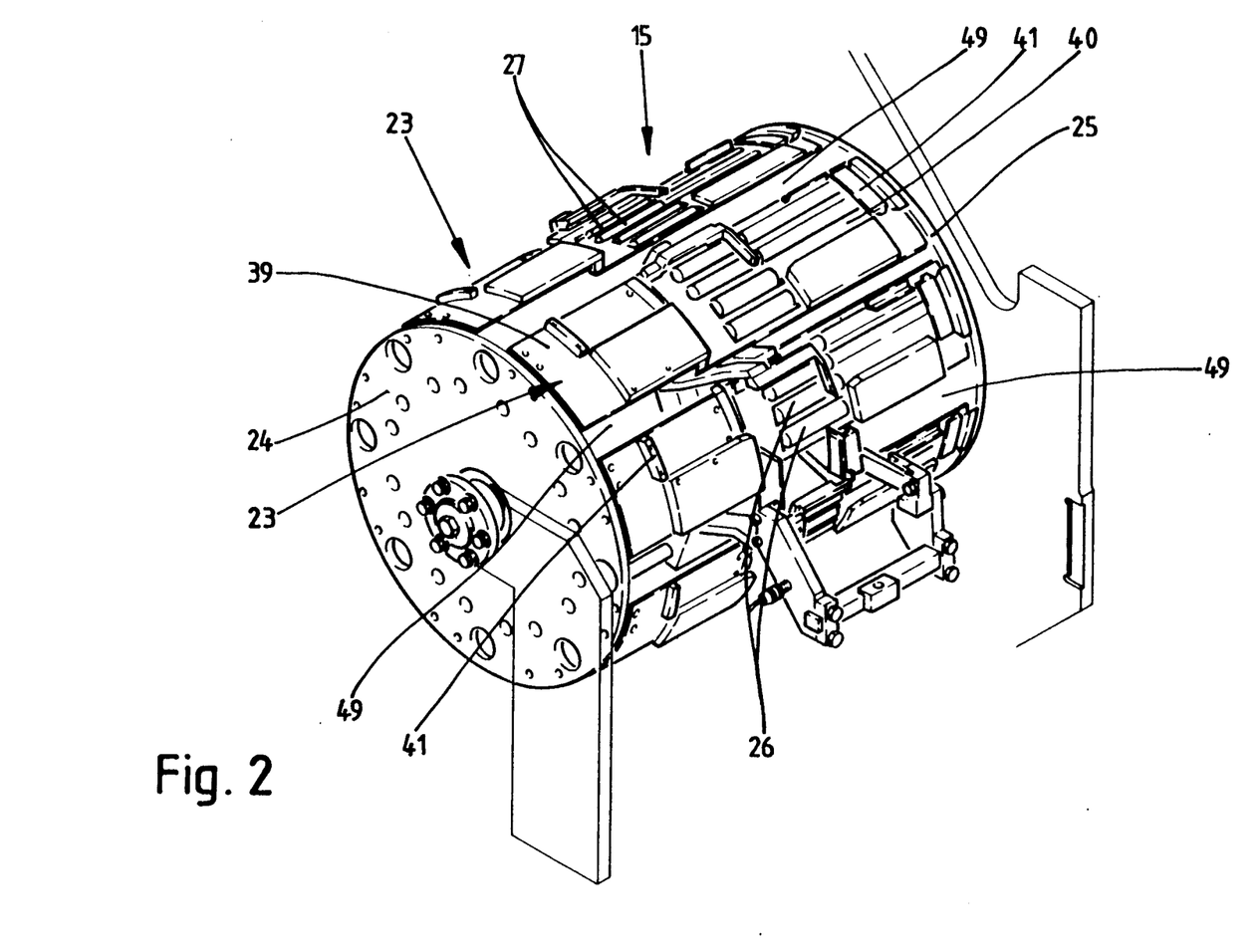
FIG. 2 shows a distributor drum as a detail of the apparatus in simplified perspective representation.

The exemplary embodiments illustrated relate to the handling of cuboid (cigarette) packs, especially of the hinge-lid type, in the region of a packaging installation. The articles, particularly packs 10, come in a closely arranged row, for example from a packaging machine (not shown), on a feed track 11. In the examples illustrated, the packs are to be fed to an outer-wrapping machine. For this purpose, in the present case, the packs 10 of the individual feed track 11 are to be distributed to two parallel discharge tracks 12 and 13 extending in the same direction. At the same time, the packs 10 are simultaneously repositioned from a vertical position in the region of the feed track 11 to a horizontal position in the region of the discharge tracks 12, 13 and are conveyed further at distances from one another. In the present case, the feed track 11 is arranged centrally relative to the discharge tracks 12 and 13, so that the packs 10 are moved transversely to both sides in order to be transferred to the discharge tracks 12 and 13.

This feed movement takes place in the region of a distributor track 14 which here is made in the form of an arc of a circle, more specifically in the form of a quarter circle. During a conveying movement directed downwards relative to the feed track 11, the packs 10 are moved apart from one another in pairs in opposite directions, that is to say transversely relative to the feed track 11, until they are aligned with the conveying tracks 12, 13 arranged at an appropriate distance from one another.

Figure 4:
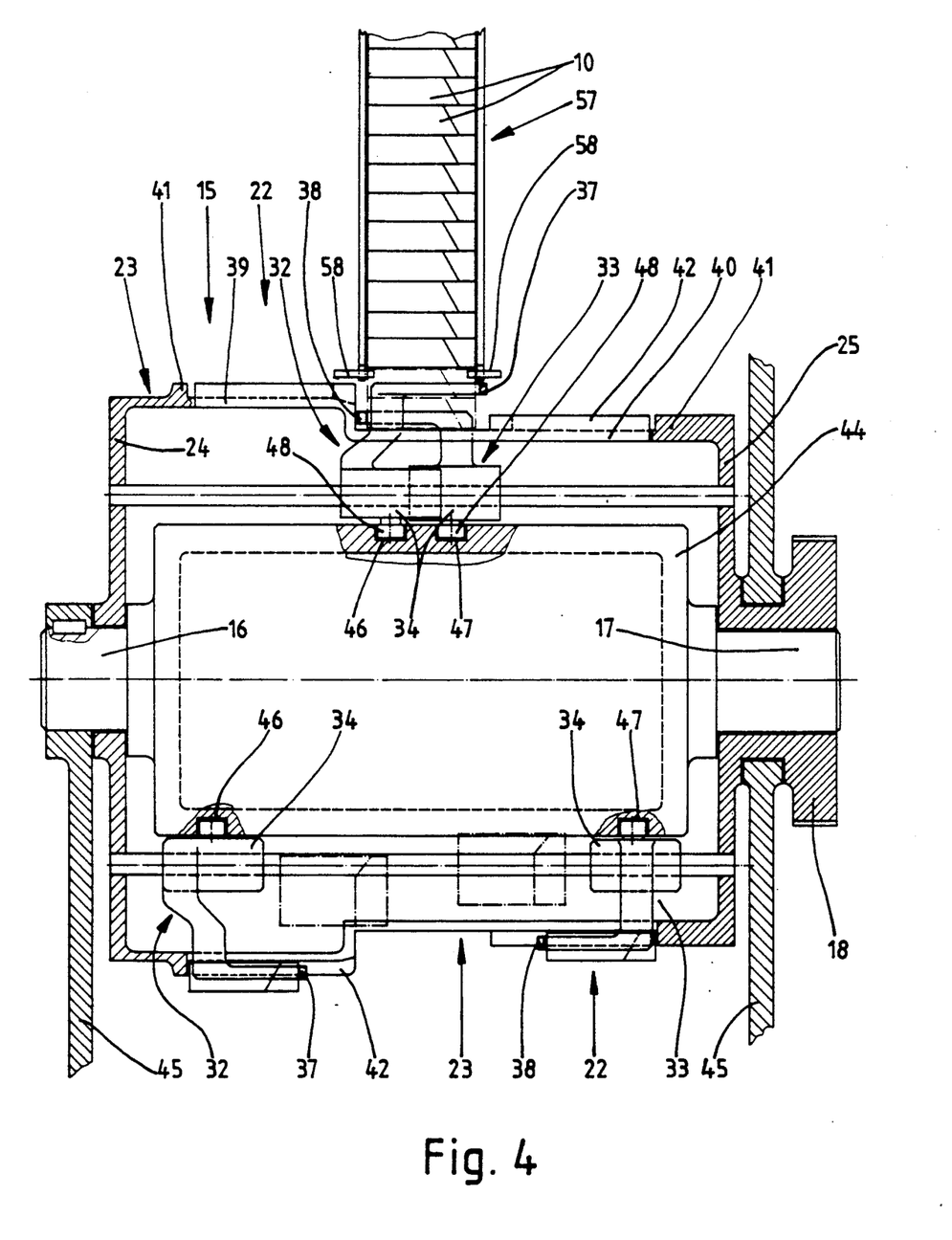
FIG. 4 shows a vertical section through the distributor drum in the region of the vertical midplane.

The central conveying member is a distributor drum 15. This is mounted rotatably as a hollow body on axial journals 16, 17 (FIG. 4), with a horizontal axis of rotation directed transversely relative to the feed track 11. The preferably continuous rotary drive of the distributor drum 15 is obtained by means of a driving gear wheel 18.

The distributor drum 15 is arranged so that the packs 10 are conveyed by the feed track 11 up to the circumference of the distributor drum 15 approximately level with a horizontal mid-plane of the latter. The feed track 11 is formed by an upper conveyor 19 and a lower conveyor 20, each in the form of a belt conveyor. These end at a distance from the circumference of the distributor drum 15. A stationary bridge 21 leads from the deflecting end of the lower conveyor 20 almost up to the circumference of the distributor drum 15.

Figure 3:
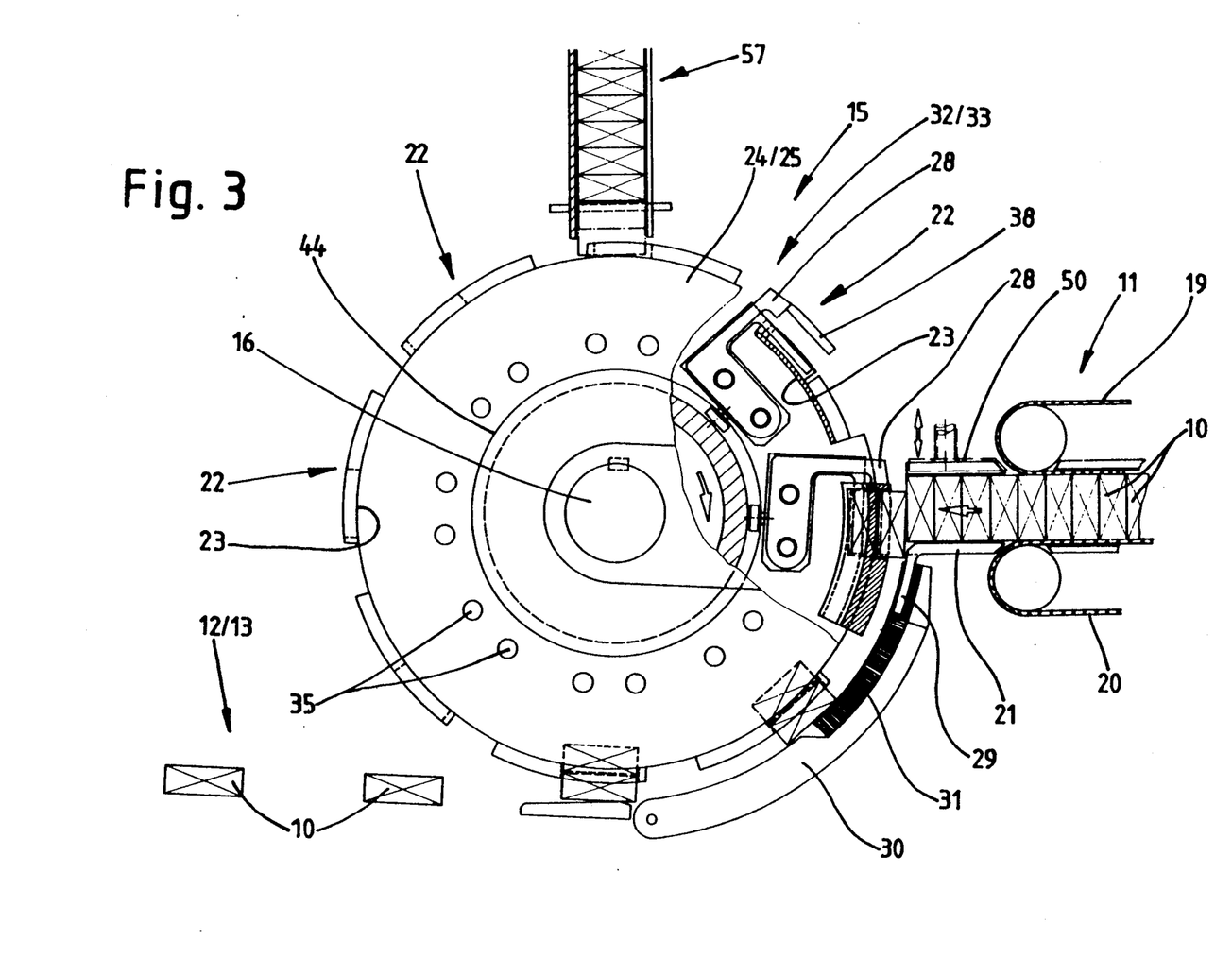
FIG. 3 shows a side view or a vertical section of the distributor drum with associated conveying members.

The two front packs 10 of the feed track 11 are each taken up by the distributor drum 15 and conveyed downwards (in the clockwise direction). For this purpose, the distributor drum 15 is equipped with several, in the present case (FIG. 3) eight distributor stations 22. These consist respectively of transversely directed strip-shaped or plate-shaped crossmembers 23 of curved cross-section. The crossmembers 23 are at the same time connecting members between lateral drum discs 24, 25.

In the region of the crossmembers 23, the (two) packs 10a, 10b are guided up to the circumference of the distributor drum 15 and then shifted in an axis-parallel manner in opposite directions towards the sides of the drum. The two packs 10a, 10b are conveyed by the upper conveyor 19 and lower conveyor 20 up against stay members arranged in the middle of the distributor drum 15. These consist of stay rollers with axes of rotation directed in an axis-parallel manner. In the exemplary embodiment shown, there are two groups of stay rollers, in particular respectively two receiving rollers 26 and, following these in the circumferential direction, two support rollers 27. The receiving rollers 26 of larger diameter or projecting further outwards in the radial direction than the support rollers 27 are mounted in the front part of the crossmember 23 in the direction of rotation of the distributor drum 15, in such a way that the front pack 10a comes to bear on the two parallel receiving rollers 26. During the continued rotational movement of the distributor drum 15, the receiving rollers 26 run on the leading face (front side or rear side) of the pack 10, until the support rollers 27 come into the region of the packs 10a, 10b. In this position, take-up devices or a common take-up device 28 come to bear on the top side (in the region of the feed track 11) of the packs 10a, 10b. These are now taken up by the distributor drum 15. Constraints in the region of the packs 10a, 10b are avoided because the support rollers 27 have a smaller diameter or are set back further inwards than the receiving rollers 26.

The bridge 21 terminates at such a distance from the crossmember 23 that the two front packs 10a, 10b are moved past the end of the bridge 21 and are thereafter retained by a downwardly directed guide leg 29 of the latter. There extends after this a stationary outer guide 30, in the form of an arc of a circle, which on the inside has a lining treating the packs 10a, 10b carefully in its sliding contact, in this particular case a brush lining 31.

The sideways shift of the packs 10a, 10b which is directed in an axis-parallel manner takes place in the region of the outer guide 30, specifically in opposite directions. For this purpose, each distributor station 22 is assigned two slide members, particularly angular cross slides 32 and 33. These are of C-shaped cross-section and are each mounted shiftably by means of a guide piece 34 on two common axis-parallel supporting rods 35. The supporting rods 35 are fastened at their ends in the drum discs 24, 25.

Each cross slide 32, 33 is equipped, at the end of an angled supporting web 36, with a take-up device 37, 38 projecting on one side and directed transversely relative to the drum axis. These extend approximately in the circumferential direction of the distributor drum 15 in different radial planes. The radially inner take-up device 37 is assigned to the inner pack 10a and the radially outer take-up device 38 at a distance from this is assigned to the outer pack 10b.

Figure 5:
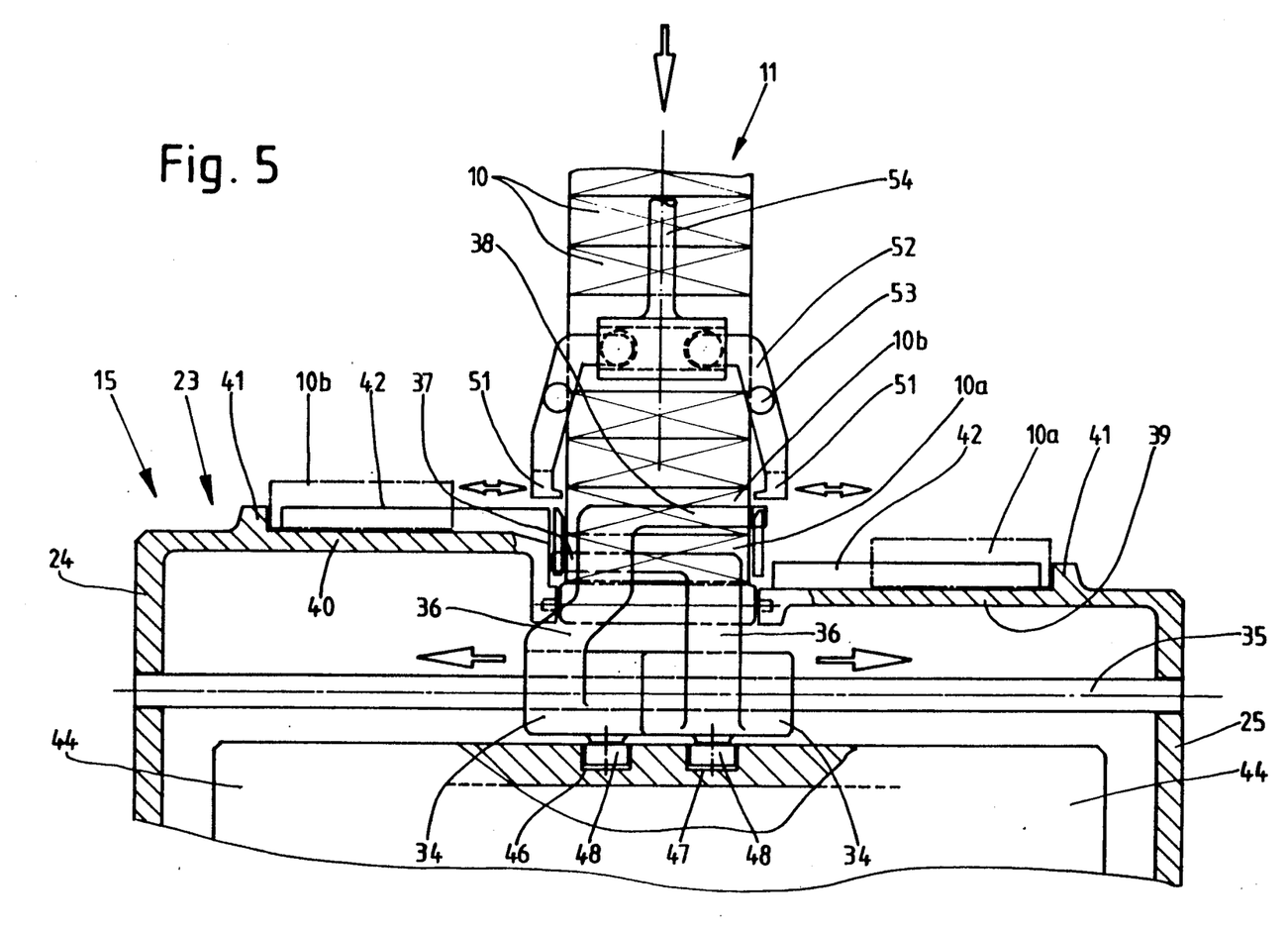
FIG. 5 shows a horizontal section through part of the distributor drum with the feed conveyor, on an enlarged scale.
Figure 6:
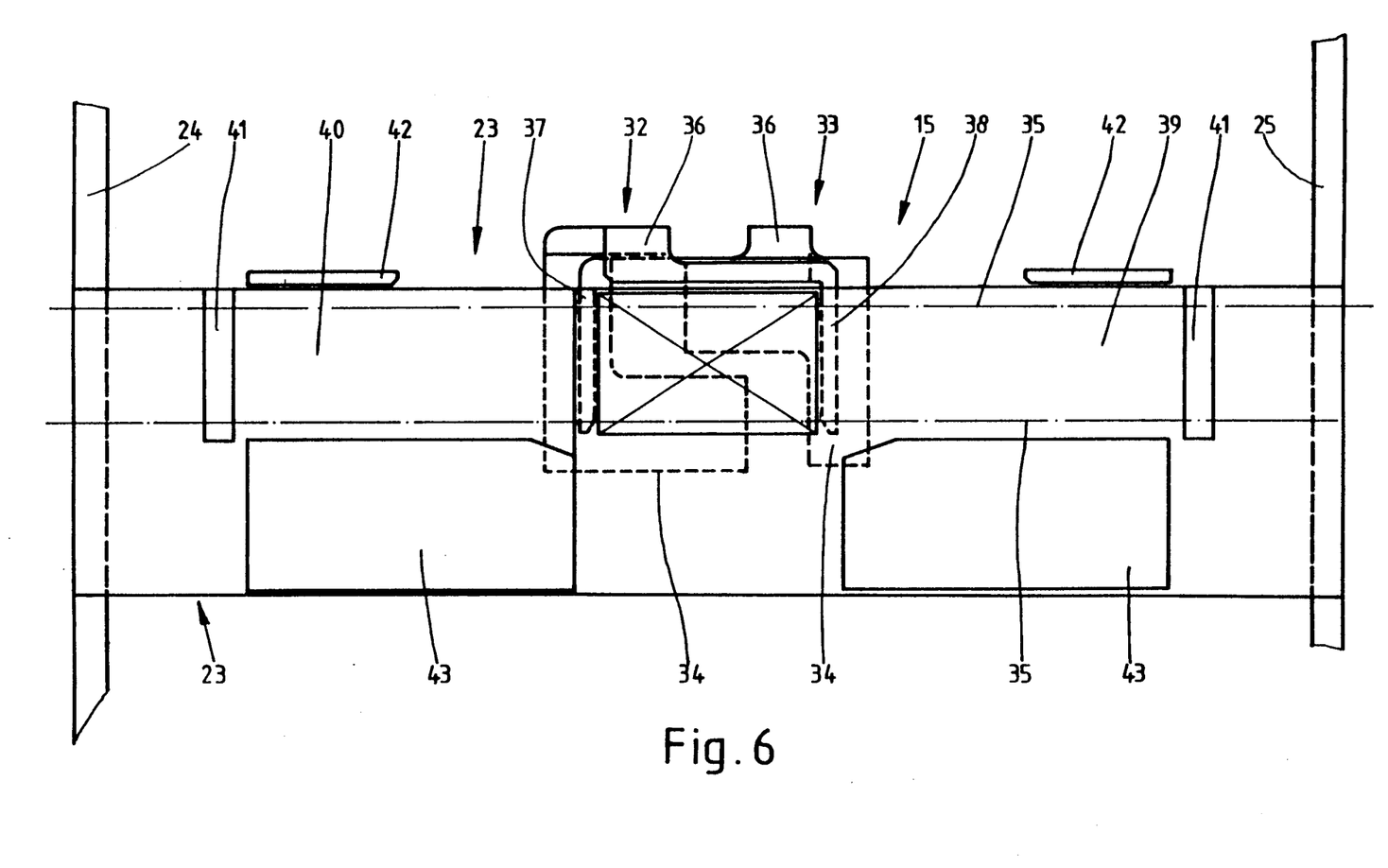
FIG. 6 shows a detail of the distributor drum in a top view, on a further enlarged scale.
Figure 7:
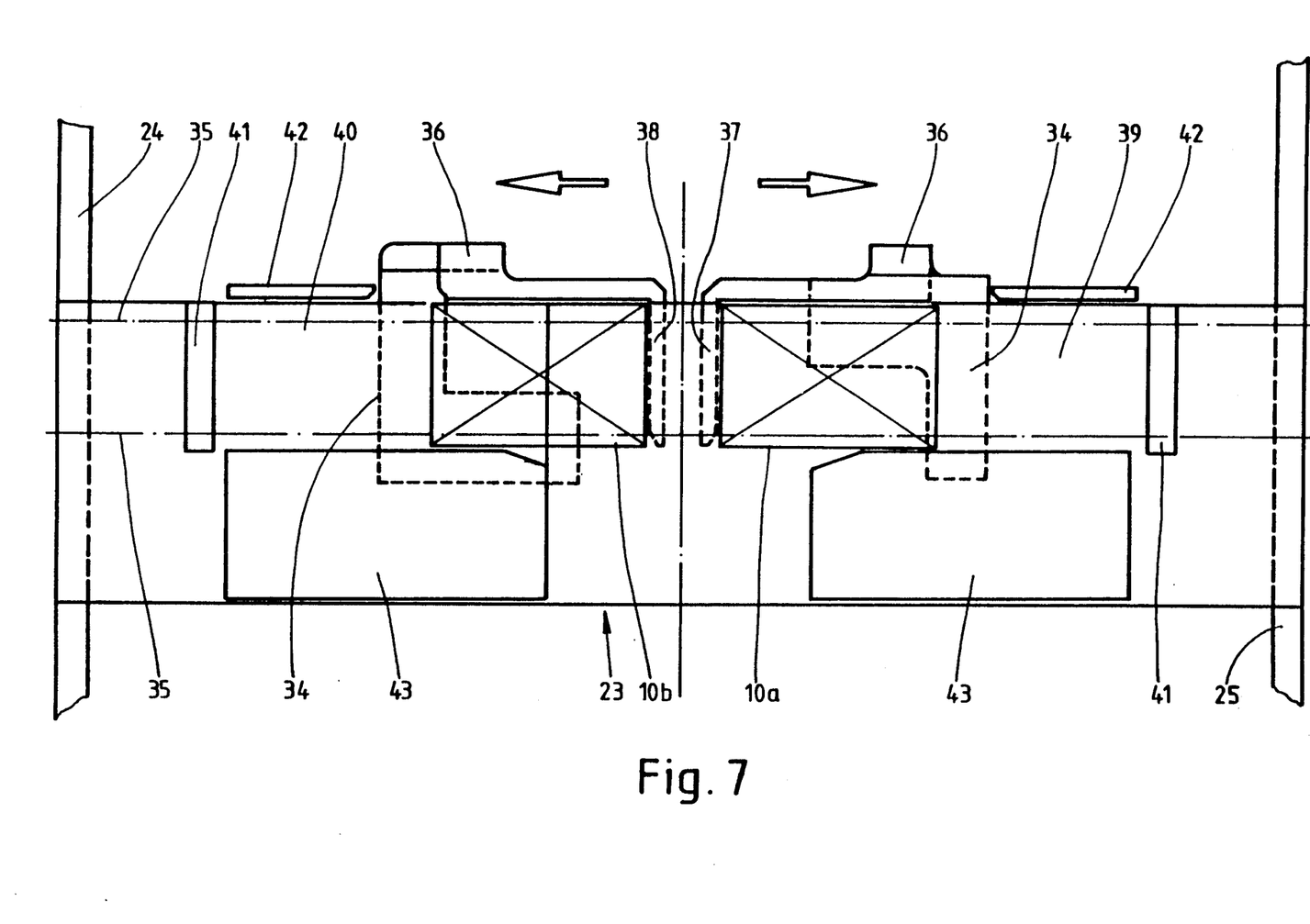
FIG. 7 shows the detail according to FIG. 6 with slide members in a changed relative position.

After the two packs 10a, 10b have been received in a distributor station 22, the cross slides 32, 33 are moved on the supporting rods 35 in opposite axis-parallel directions. In the representation according to FIG. 5, the inner pack 10a is moved to the right and the outer pack 10b to the left. The radial distance from the drum axis is not changed thereby. The packs 10a, 10b are shifted on the circumference of the distributor drum 15 on support plates 39, 40 which are parts of the crossmember 23. Support plates 39, 40 are arranged in radially offset planes, in particular aligned respectively with the offset packs 10a, 10b. The inner pack 10a is pushed off from the support rollers 27 onto the associated support plate 39 and the outer pack 10b is pushed off from the inner pack 10a to the support plate 40.

In the lateral end positions, the packs 10a, 10b each rest against an outer stop 41. In the circumferential direction, a stop web 42 is arranged on one side and, opposite it, an attachment piece 43 is arranged on the outside of the crossmember 23 in order to limit a receptacle for the pack 10a, 10b. In this position, namely against the outer stop 41, the packs 10a, 10b on the underside of the distributor drum 15 are transferred to the discharge track 12, 13, in the present case by being deposited as result of their own weight on conveyors not shown in detail, for example conveyor belts.

The movement of the cross slides 32, 33 is controlled by means of cams. In the exemplary embodiment illustrated, a stationary, that is to say non-rotating cam drum 44 is mounted inside the distributor drum 15 concentrically relative to this. The axial journals 16, 17 are arranged on the cam drum 44, the axial journal 16 being mounted directly and non-rotatably in the machine stand. The axial journal 17 serves as a bearing for the drum disc 25 and the driving gear wheel 18.

The cam drum 44 is equipped with two control cams 46 and 47 which are formed by grooves and which extend along the circumference. These are entered by tracer rollers 48 which are each connected to a cross slide 32, 33, particularly to its guide piece 34. The design of the control cams 46, 47 ensures that, during the rotation of the distributor drum 15, the cross slides 32, 33 are movable out of the middle initial position (FIGS. 4 and 5) in a lateral position, at the same time taking up the packs 10a, 10b.

The supporting rods 35 holding the cross slides 32, 33 are likewise arranged within the distributor drum 15, particularly between the outer casing formed by the crossmembers 23 and the cam drum 44. A gap 49 continuous over the width of the distributor drum 15 is formed between the respective adjacent crossmembers 23. The holding members (supporting web 36) of the cross slides 32, 33 pass through this gap onto the outside of the distributor drum 15.

Figure 8:
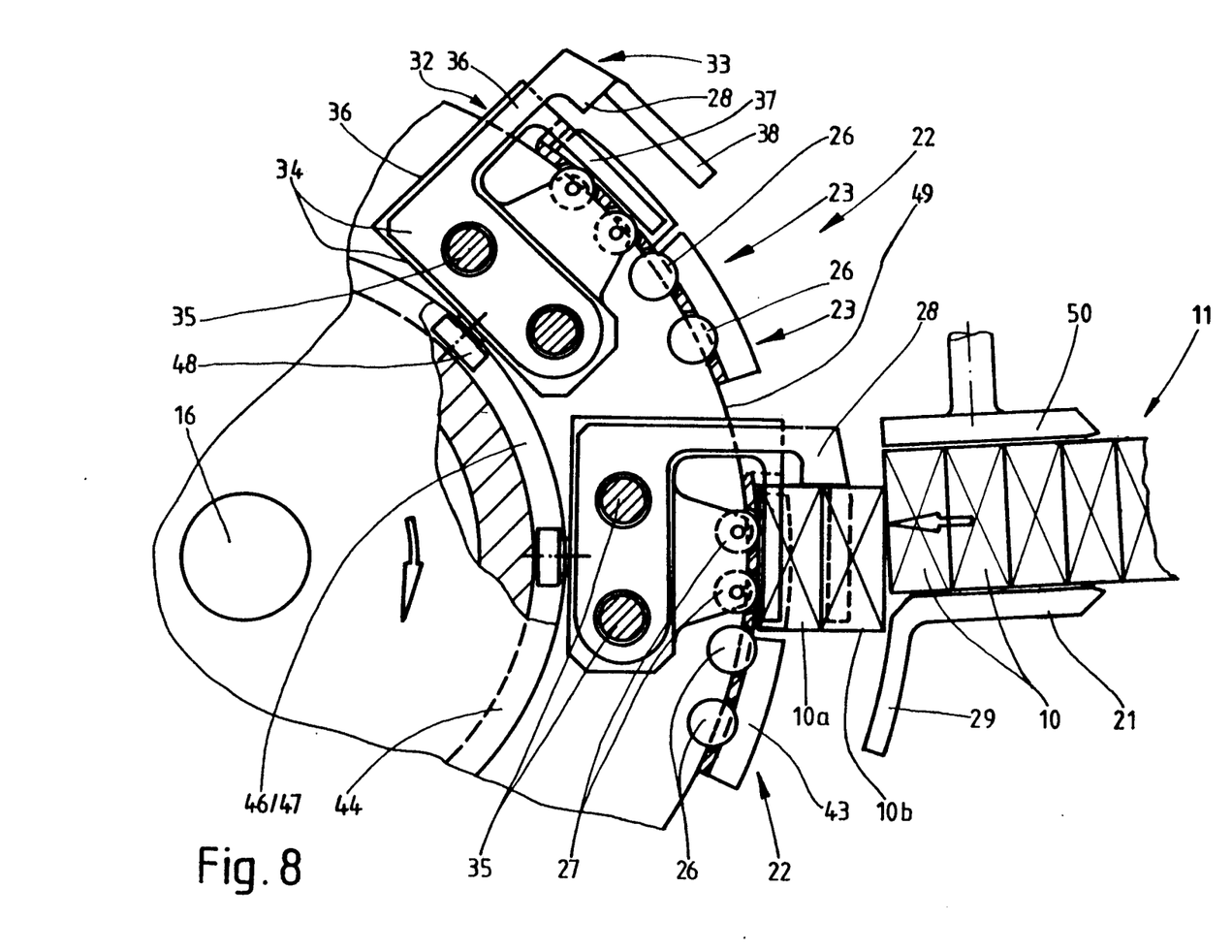
FIG. 8 shows a cutout from the distributor drum in a vertical section taken in a plane offset relative to FIG. 3.
Figure 9:
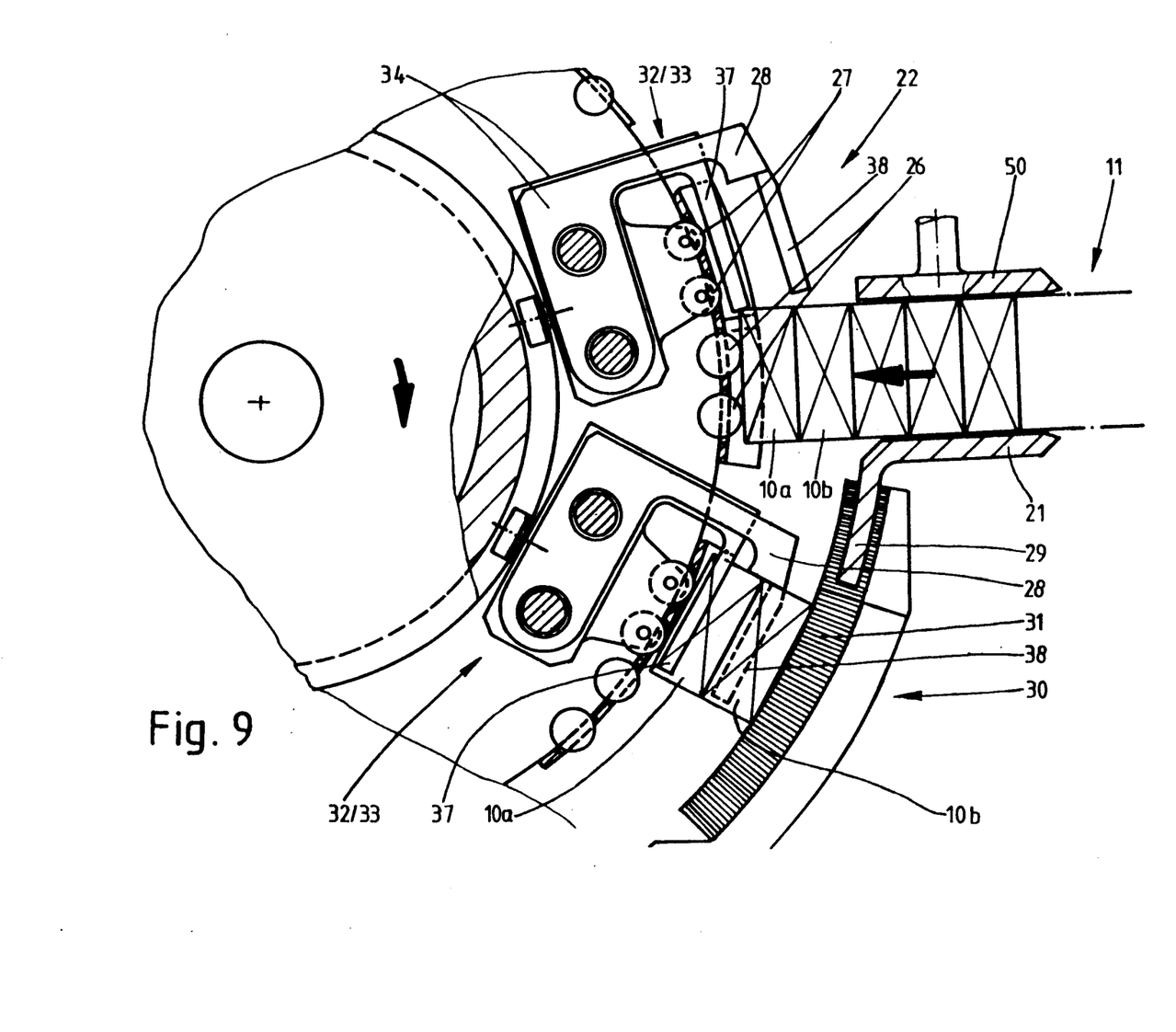
FIG. 9 shows a distributor drum in a representation corresponding to that of FIG. 8, in a changed rotary position.

In order to guarantee that two packs 10a, 10b at a time are taken over by the distributor drum 15 in the way described, the following close succession of packs 10 in the region of the feed track 11 is halted temporarily. For this purpose, in the exemplary embodiment illustrated, a retention member is mounted above the stationary bridge 21. In the exemplary embodiment shown (FIGS. 3, 8 and 9), this retention member is arranged as a pressing-down ram 50 above the row of packs 10. After the pack 10a comes to bear against the (larger) receiving rollers 26, the pressing-down ram 50 is lowered, so that the front packs 10 in the region of the bridge 21 are pressed against the latter and thereby halted. The support rollers 27 thereafter come into the region of the packs 10a, 10b, so that a necessary interspace is obtained opposite the subsequent retained packs 10.

Furthermore, located in the region of the feed track 11 is a stopping mechanism for the closely arranged row of packs 10. In the present exemplary embodiment, this stopping mechanism consists of stops 51 which can be introduced laterally into the feed track 11. These enter the feed track 11 on the occasion of necessary interruptions in the feed of packs 10, in such a way that the conveyance of the packs is interrupted in the region of the bridge 21. In the present case, the stops 51 are mounted on pivoting arms 52 which are pivotable about a rotary bearing 53 and which are actuable by means of a common tappet 54.

Figure 10:
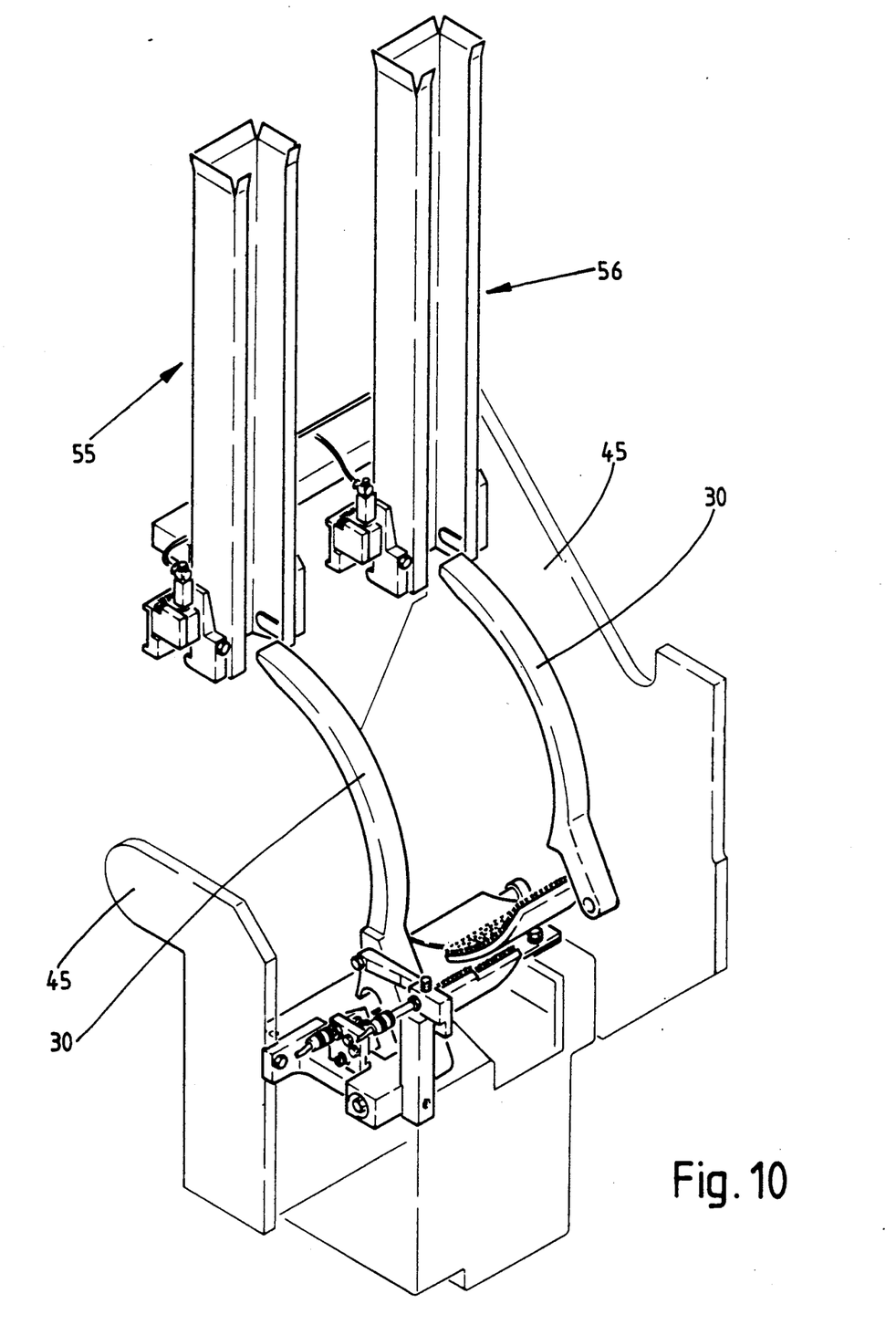
FIG. 10 shows a perspective representation of replenishing shafts intended for articles and assigned to the distributor drum.

An interruption in the feed of packs 10 via the feed track 11 can be necessary, for example, when defective packs are introduced into the conveying process via one or two replenishing shafts 55, 56 after the defect has been rectified. The replenishing shafts 55, 56 are loaded by hand. They terminate on the top side of the distributor drum 15 in a position which allows packs 10 to be transferred to the distributor drum 15 in correct relative position corresponding to the discharge tracks 12, 13 (FIG. 10).

If the distributor drum 15 is assigned only a single centrally arranged replenishing shaft 57 (FIG. 4), the cigarette packs are extracted from this replenishing shaft 57 in the way described in relation to the feed via the feed track 11 and are distributed towards the sides from the middle position. Arranged at the lower ends of the replenishing shafts 55, 56, 57 are detents 58 which project into the replenishing shaft, 55, 56, 57 and which are moved back in order to empty these.

Figure 11:
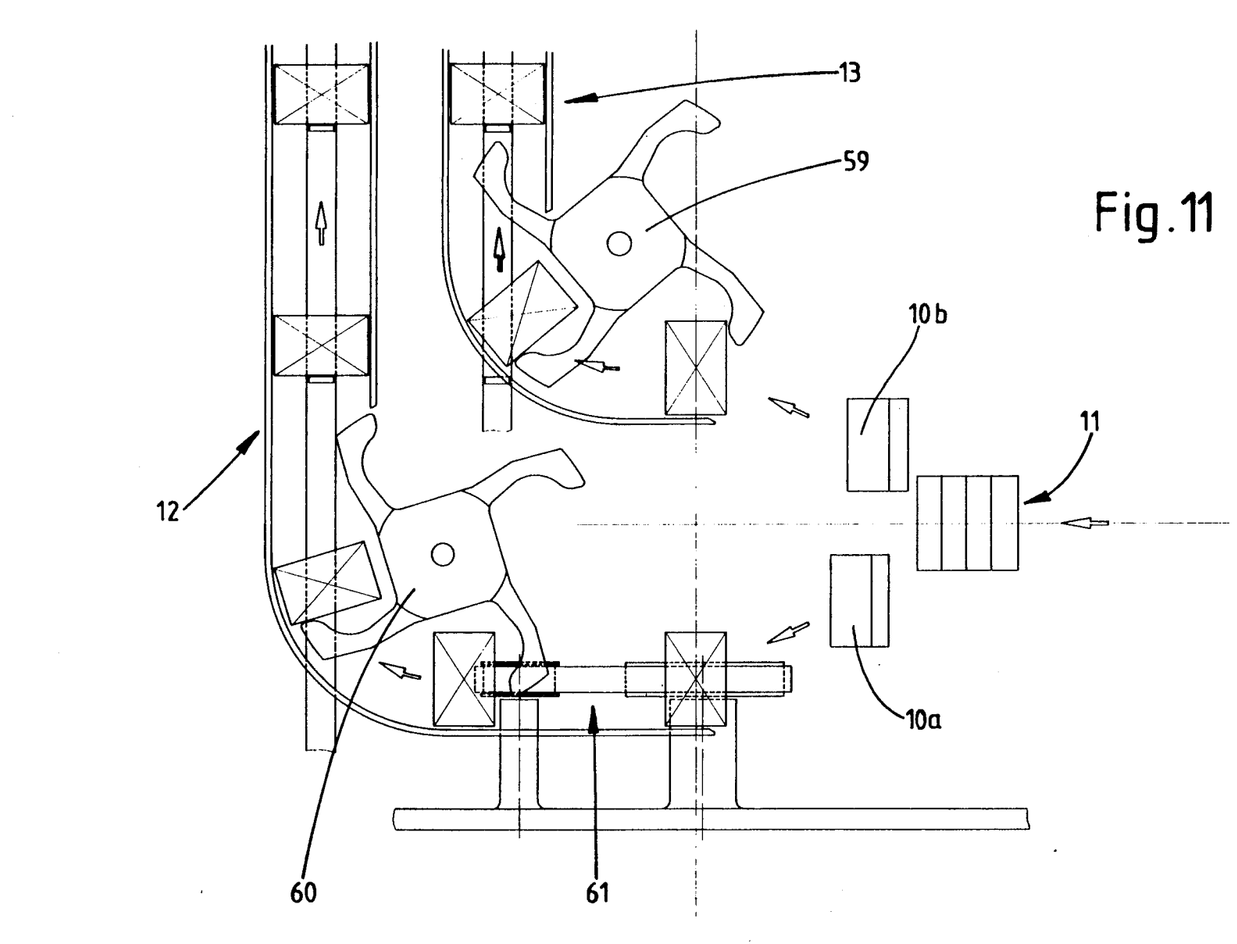
FIG. 11 shows a simplified representation of conveying tracks of a second embodiment of the invention, with a deflection in the region of the discharge tracks.

FIG. 11 shows an alternative version in terms of the design of the discharge tracks 12, 13. Here, these are designed with a deflection, in such a way that initially a first part of the discharge track 12, 13 extends in the direction of the feed track 11 and then the further part extends transversely relative to this. The packs 10a, 10b coming out of the distributor drum 15 in the lower region are introduced by means of deflecting wheels 59, 60 into the angled or transverse parts of the discharge tracks 12, 13. These deflecting wheels correspond in terms of construction and mode of operation to the deflecting wheel designated as a conveyor cross in German Patent Specification 3,117,859.

Since the deflecting wheel 60 of the outer discharge track 12 is at a greater distance from the distributor drum 15 because of the geometrical condition, arranged in this region is an intermediate conveyor 61 which feeds the packs 10a out of the region of the distributor drum 15 to the deflecting wheel 60. The deflecting wheel 59 takes over the packs 10b directly from the distributor drum 15. The intermediate conveyor 61 is designed as a conveyor belt, if appropriate with take-up devices for the packs 10.

What is claimed is:

1. Process for continuously transferring articles, being continuously fed in a longitudinal direction in a continuous series on a horizontal feed track, onto two horizontal discharge tracks disposed downstream of said feed track, said process comprising: placing a distributor track (14) between said feed track and said discharge tracks (12, 13); continuously feeding the articles from said feed track (11) onto said distributor track (14) for transport thereby; differently transversely shifting the articles during transport thereof on said distributor track (14); then feeding the shifted articles to respective ones of said discharge tracks (12, 13);

transporting the articles along the distributor track (14) in a path in the form of at least a quarter circle; and simultaneously transversely shifting the articles (10) into longitudinal alignment with the discharge tracks (12, 13);

positioning the two discharge tracks (12, 13) on transversely opposite sides of an extension of a longitudinal axis of the feed conveyor (11); simultaneously feeding two articles (10) at a time from the feed track (11) to the distributor track (14); and, while the two articles are being transported along said path in the form of said at least a quarter circle, transversely shifting the two articles in opposite directions until they come into longitudinal alignment with the two discharge tracks (12, 13), respectively.

2. Process according to claim 1, wherein both said horizontal feed track (11) and the discharge tracks (12, 13) extend in the longitudinal direction, and further comprising vertically offsetting the discharge tracks (12, 13) to a horizontal level lower than that of the feed track (11).

3. Process according to claim 1, comprising, while the articles are being transported along said path in the form of a quarter circle, turning the articles (10) by 90° from an upright vertical position on said feed track (11) to a flat-lying horizontal position for feeding onto the discharge tracks (12, 13).

4. Process according to claim 3, comprising simultaneously performing said shifting and turning steps until the articles are longitudinally aligned with the discharge tracks (12, 13) which are disposed on opposite transverse sides of an extension of a longitudinal axis of the central feed track (11).

5. Apparatus for allocating a plurality of articles being conveyed on a common feed track to two parallel, longitudinally extending discharge tracks transversely spaced at a distance from one another, said apparatus comprising: a continuously rotating cylindrical distributor drum means for receiving on a circumferential surface thereof the conveyed articles from said feed track and for feeding said articles to the discharge tracks by means of the rotational movement of said drum, said distributor drum having a rotation axis transversely extending relative to a longitudinal axis of said feed track; and means for transversely shifting the articles (10) on said circumference of said drum (15), during said rotational movement, in alternately opposite directions which are parallel to said axis of rotation of said drum (15); and wherein two articles (10a, 10b) located one upon the other in the radial direction of the distributor drum (15) are received simultaneously by the distributor drum (15) and, during the rotation of said distributor drum (15) around said axis, are simultaneously shifted in opposite axial directions to the sides of the distributor drum (15).

6. Apparatus according to claim 5, wherein said distributor drum (15) comprises several distributor stations (22) arranged at equal circumferential distances from one another and each receiving articles (10, 10a, 10b); and wherein each distributor station (22) has associated therewith two cross slide means (32, 33) each of which transversely shifts an assigned one of the articles (10; 10a, 10b) and which are movable in opposite transverse directions.

7. Apparatus for allocating a plurality of articles being conveyed on a common feed track to two parallel, longitudinally extending discharge tracks transversely spaced at a distance from one another, said apparatus comprising: a continuously rotating cylindrical distributor drum means for receiving on a circumferential surface thereof the conveyed articles from said feed track and for feeding said articles to the discharge tracks by means of the rotational movement of said drum, said distributor drum having a rotation axis transversely extending relative to a longitudinal axis of said feed track; and means for transversely shifting the articles (10) on said circumference of said drum (15) during said rotational movement, in alternately opposite directions which are parallel to said axis of rotation of said drum (15);

wherein said distributor drum (15) comprises several distributor stations (22) arranged at equal circumferential distances from one another and each receiving articles (10, 10a, 10b); wherein each distributor station (22) has associated therewith two cross side means (32, 33) each of which transversely shifts an assigned one of the articles (10; 10a, 10b) and which are movable in opposite transverse directions; and wherein said distributor drum (15) comprises: in a region of a horizontal midplane thereof, take-up means (28) for grasping two of said articles (10a, 10b); and means for fixing following articles (10) on the feed track (11) to form a small clearance relative to the articles (10a, 10b) received by said distributor drum (15).

8. Apparatus according to claim 7, wherein said distributor drum (15) comprises rotatable receiving rollers (26) which receive the conveyed articles (10) from the feed track (11) and which allow a rolling movement along a bearing surface of the articles (10) until the articles are taken up by the distributor drum (15).

9. Apparatus according to claim 8, wherein in a middle region of said distributor drum (15), said each distributor station (22) has both said receiving rollers (26) and also support rollers (27) set back inwardly relative to said receiving rollers (26) in the radial direction, so that a front one of said articles (10a) rests against the support rollers (27) during the take-up by the distributor drum (15).

10. Apparatus according to claim 9, wherein said distributor drum (15) comprises in said each distributor station (22) support plates (39, 40) arranged in radially offset planes; said shifting means, during said rotational movement, transversely shifting the two articles (10a, 10b), which are taken up by the distributor drum (15) so as to be located one upon the other in the radial direction, without any change in radial distance from said rotation axis of said drum.

11. Apparatus according to claim 10, wherein said drum (15) has two axially spaced end discs; and wherein said support plates (39, 40) are part of a transversely directed cross member means (23) on which said receiving rollers (26) and support rollers (27) are also mounted and which functions to connect said two end discs (24, 25) at a distance from one another.

12. Apparatus according to claim 6, wherein said two cross slides (32,, 33) are movable from a central position in opposite transverse directions toward opposite axial ends of said distributor drum (15); and wherein each cross-slide has a take-up means (37, 38) for bearing on one side face of an incoming article (10).

13. Apparatus according to claim 12, further comprising: two supporting rods (35) spaced at a distance from one another; control cams (46, 47); guide piece means (34) for mounting each of said cross slide means (32, 33) on said two supporting rods; and tracer roller means (48) for shifting said cross slide means along said two supporting rods, wherein said tracer roller means (48) are attached to each guide piece means (34) and enter said control cams (46, 47).

14. Apparatus according to claim 13, wherein said control cams (46, 47) are on a fixedly located cam drum (44) disposed within said distributor drum (15).

15. Apparatus according to claim 14, wherein said supporting rods (35) are arranged within the distributor drum (15) as holding members for the cross slide means (32, 33), and the guide piece means (34) are connected to the take-up means (37, 38) via supporting webs (36) which pass through gaps (49) between adjacent distributor stations (22).

16. Apparatus according to claim 10, further comprising: a replenishing shaft (27), centrally disposed relative to said distributor drum (15), for feeding additional articles (10) to said distributor drum (15); said replenishing shaft being disposed on the top side of the distributor drum (15) in a region of said receiving rollers (26) and said support rollers (27).

17. Apparatus according to claim 10, further comprising: two replenishing shafts (55, 56) for feeding additional articles (10) to said distributor drum (15), said two replenishing shafts (55, 56) being spaced at a distance from one another and extending above said support plates (39, 40) in positions corresponding to end positions of the articles (10a, 10b).

* * * * *